(12) United States Patent
Mondt et al.

(10) Patent No.: US 8,614,424 B2
(45) Date of Patent: Dec. 24, 2013

(54) DEVICE COMPRISING MEANS FOR GUIDING FLUID FROM AN INLET TO AN OUTLET

(75) Inventors: Eva Mondt, Eindhoven (NL); Paulus Cornelis Duineveld, Drachten (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 13/389,679

(22) PCT Filed: Aug. 3, 2010

(86) PCT No.: PCT/IB2010/053514
§ 371 (c)(1),
(2), (4) Date: Feb. 9, 2012

(87) PCT Pub. No.: WO2011/018735
PCT Pub. Date: Feb. 17, 2011

(65) Prior Publication Data
US 2012/0138817 A1    Jun. 7, 2012

(30) Foreign Application Priority Data
Aug. 13, 2009    (EP) .................................... 09167767

(51) Int. Cl.
*G01N 23/12*    (2006.01)
(52) U.S. Cl.
USPC ......................................................... 250/437
(58) Field of Classification Search
USPC ...... 250/437, 436, 434, 432 R, 431, 428, 438
See application file for complete search history.

(56) References Cited

U.S. PATENT DOCUMENTS

| | | | | |
|---|---|---|---|---|
| 3,286,992 A | * | 11/1966 | Armeniades et al. | 366/339 |
| 3,811,531 A | * | 5/1974 | Forssman | 181/258 |
| 4,631,018 A | * | 12/1986 | Valteris et al. | 425/445 |
| 5,503,800 A | | 4/1996 | Free | |
| 5,888,403 A | * | 3/1999 | Hayashi | 210/695 |
| 7,547,002 B2 | * | 6/2009 | Mao et al. | 261/78.1 |
| 2003/0049809 A1 | | 3/2003 | Kaiser et al. | |
| 2006/0150614 A1 | * | 7/2006 | Cummings | 60/275 |
| 2006/0270960 A1 | * | 11/2006 | Karp | 604/6.08 |
| 2008/0095661 A1 | | 4/2008 | Kohler | |
| 2008/0206095 A1 | * | 8/2008 | Duthie | 422/24 |
| 2010/0111345 A1 | * | 5/2010 | Andrea et al. | 381/359 |
| 2010/0242192 A1 | * | 9/2010 | Backman et al. | 15/4 |
| 2010/0303679 A1 | * | 12/2010 | Kim | 422/186.3 |
| 2011/0026225 A1 | * | 2/2011 | Ostwald et al. | 361/699 |
| 2011/0026357 A1 | * | 2/2011 | Ohtsuka et al. | 366/118 |
| 2011/0120645 A1 | * | 5/2011 | Jorgenson et al. | 156/328 |

FOREIGN PATENT DOCUMENTS

| | | |
|---|---|---|
| DE | 4222686 A1 | 1/1994 |
| DE | 19801705 A1 | 7/1999 |
| EP | 0202820 A2 | 11/1986 |

(Continued)

*Primary Examiner* — Robert Kim
*Assistant Examiner* — Jason McCormack

(57) ABSTRACT

A device including a housing having an interior space for containing fluid, an inlet for letting in fluid to the housing, an outlet for letting out fluid from the housing, an element which is arranged inside the housing, and fluid guiding components which are arranged in the housing as well and which serve for guiding the fluid from the inlet side of the housing to the outlet side of the housing, around the element. The fluid guiding components may be zigzag-shaped extending along at least a portion of the element and, as a combination, providing complete coverage of the element in a circumferential direction.

16 Claims, 3 Drawing Sheets

(56) References Cited

FOREIGN PATENT DOCUMENTS

| | | |
|---|---|---|
| EP | 0697374 A1 | 8/1994 |
| EP | 0616975 A2 | 9/1994 |
| EP | 0803472 A1 | 4/1997 |
| EP | 1916224 A1 | 4/2008 |
| GB | 2175779 A | 12/1986 |
| JP | 59150589 A | 8/1984 |
| JP | 2003245660 A | 9/2003 |
| WO | 9515294 A1 | 6/1995 |
| WO | 03092746 A1 | 11/2003 |

* cited by examiner

DEVICE COMPRISING MEANS FOR GUIDING FLUID FROM AN INLET TO AN OUTLET

FIELD OF THE INVENTION

The present invention relates to a device, comprising a housing having an interior space for containing fluid; an inlet for letting in fluid to the housing; an outlet for letting out fluid from the housing; an element which is arranged inside the housing; and means which are arranged inside the housing as well, and which serve for guiding the fluid from an inlet side of the housing to an outlet side of the housing, around the element.

BACKGROUND OF THE INVENTION

A well-known example of a device as defined in the preceding paragraph is a device for disinfecting water, in which the element which is arranged inside the housing is a source such as a lamp for emitting ultraviolet light, in particular of the type commonly referred to as UV-C. Exposing infected water to the ultraviolet light has a purifying effect on the water on the basis of the fact that the UV-C light is capable of killing germs. For domestic applications, the ultraviolet source is usually enclosed in a non-opaque holding structure, enabling the desired exposure of the water to the source.

For sufficient germicidal action, the ultraviolet disinfecting source has to produce a certain ultraviolet dose, expressed in $J/m^2$. The dose is given by the irradiance ($W/m^2$) multiplied by a residence time (s) of the bacteria in the device. The residence time as mentioned is determined by the flow paths of the water, and the irradiance level by the type of ultraviolet source which is applied.

When designing a water disinfecting device as mentioned, it has to be kept in mind that the irradiance of the ultraviolet source decays linearly, or, depending on the extent to which absorption takes place, linearly and exponentially with the radial distance to the source. In view of this fact, in order to achieve a desired effectiveness of the device, it is advantageous if measures are taken to ensure that radial mixing of the water elements takes place. By providing for radial mixing it is intended that all water elements pass the ultraviolet source on a very short distance at some point. Irradiance levels close to the source are so large that a short exposure of the bacteria in the vicinity of the source is sufficient to eliminate them.

Hence, a general problem that is encountered in the field of water disinfecting devices is that radial mixing is required to achieve a required dose in a limited exposure time or compact design.

According to a known possibility of enhancing radial mixing, a swirling flow is created by installing mixers upstream of the ultraviolet source, or by designing the inlet such that a spiraling motion occurs. This possibility is known from EP 803472, US 2008/0095661 and EP 616975. However, as the rotation is only imparted on the water at the inlet side, it will decay downstream. As a result, the degree of mixing is not constant over the length of the ultraviolet source, and the dose output is not optimal.

According to another known possibility of enhancing radial mixing, an inner wall of the housing is modified such as to be capable of creating a mixing effect in water that passes the wall. In this respect, U.S. Pat. No. 5,503,800 teaches the creation of grooves in an axial direction. However, there may be "dead zones" between the grooves, i.e. zones where the desired mixing effect does not occur, and where the water flows in an axial direction, more or less parallel to the ultraviolet source. As such flow paths are at a relatively large distance from the source, the required dose is not met. EP 202820 discloses another way of enhancing radial displacement of the water elements, namely applying ridges to restrict a flow in the axial direction. However, in that case, mixing is not optimal, as water is forced to flow towards the ultraviolet source at the expense of a higher velocity and thus shorter residence times.

Another problem that is encountered in the field of water disinfecting devices is that so-called short-cuts may be present. Short-cuts are flow paths leading directly from the inlet to the outlet. Bacteria following these short-cuts have very short residence times. Especially when the short-cuts prevail at an outer radius of the section where the ultraviolet source is arranged, at which location irradiance levels are lowest, very low dose levels result. Short-cuts are generally caused by certain inflow conditions and/or inappropriate mixing.

A known way of eliminating short-cuts involves placing a helically-shaped component in the section where the ultraviolet source is arranged, wherein the positioning of the component with respect to the ultraviolet source is such that the source is extending in the centre of the component. US 2003/0049809 discloses an example of such a component. When the component is applied, the water is forced to follow the helical shape, so that short-cuts are avoided. However, when the water follows a path around the ultraviolet source which is perfectly helical, the radial distance of the bacteria to the source does not vary while traveling through the section where the source is arranged. Therefore, there is actually no radial mixing, and no increase in dose output can be expected.

SUMMARY OF THE INVENTION

It is an object of the present invention to provide a solution to the above-sketched problems. In particular, it is an object of the present invention to provide a device in which radial mixing of a fluid is enhanced, and short-cuts are avoided at the same time.

According to the present invention, a device is provided, which comprises a housing having an interior space for containing fluid; an inlet for letting in fluid to the housing; an outlet for letting out fluid from the housing; an element which is arranged inside the housing; and means which are arranged inside the housing as well, and which serve for guiding the fluid from an inlet side of the housing to an outlet side of the housing, around the element; wherein the fluid guiding means comprise two zigzag-shaped components extending along at least a portion of the element and, as a combination, providing complete coverage of the element in a circumferential direction, i.e. a direction around the element, as seen along a total of a length of the zigzag-shaped components in an axial direction of the element, wherein each of the zigzag-shaped components partly surrounds the element and bridges a space between the element and an inner wall of the housing; wherein, in an axial direction of the element, the zigzag-shaped components are arranged in a shifted fashion; and wherein the zigzag-shaped components partly overlap in the circumferential direction.

In the device according to the present invention, radial mixing around an element which is arranged inside the housing, and which will hereinafter be referred to as central element, is created by applying two zigzag-shaped components. When water or another fluid follows the zigzag-shaped components, the water is forced to cross the central element in a radial direction, i.e. a direction perpendicular to the axial direction of the central element, wherein the number of times that such a crossing is realized is dependent on the number of steps of the zigzag-shaped components. By not using a single helical component surrounding the central element, but using two zigzag-shaped components at mutually shifted positions in the axial direction, it is achieved that two counter current flow directions are applied to the water. In this way, mixing is enhanced. Furthermore, tests which have been performed on the device according to the present invention have shown that recirculation zones are obtained between the zigzag-shaped components. These zones enhance mixing even further.

Furthermore, with the two zigzag-shaped components which are arranged at mutually shifted positions in the axial direction, there can be no zones which are totally shielded from the ultraviolet source. Short-cuts are avoided on the basis of the fact that the zigzag-shaped components are extending over an entire diameter of the device between the central element and the inner wall of the housing, as well as the fact that there is overlap of the zigzag-shaped components in the circumferential direction.

A manufacturing process of zigzag-shaped components is relatively simple, as the components may be obtained by making appropriate cuts in a single sheet, and bending the basic product that is realized in this way. This is not possible when a helix would be required, as in such a case, complex techniques like three-dimensional milling techniques need to be applied. Hence, when a factor like the manufacturing costs is taken into account, the zigzag shape is preferred over the helical shape.

In respect of the overlap as mentioned, it may be so that each of the zigzag-shaped components spans an angle of more than 180° around the central element. In fact, both zigzag-shaped components may be equal. It is preferred if a circumferential overlap angle is in a range of 5° to 45°, and it is even more preferred if a circumferential overlap angle is in a range of 5° to 15°. On the basis of the presence of the overlap, short-cuts between the two zigzag-shaped components are avoided, and water is forced to flow constantly from one zigzag-shaped component to the other and back, wherein there is no way of by-passing the components.

The central element may be a source for emitting ultraviolet light, so that the device according to the present invention is suitable to be applied as a water disinfecting device.

In a practical embodiment of the device according to the present invention, the housing is shaped like a cylinder having a circular circumference, wherein each step of the zigzag-shaped components is shaped like a portion of an ellipse having a central hole. It will be understood that the central hole is for allowing the central element to extend between the zigzag-shaped components, whereas the ellipse shape is explained on the basis of the fact that each step has an inclined orientation with respect to a central axis of the cylindrical housing.

Preferably, the zigzag-shaped components contact both the central element and the inner wall of the housing. In the context of a water disinfecting device, it is especially important that no short-cuts can occur between the zigzag-shaped components and the inner wall of the housing, as such short-cuts would be present at the longest radial distance with respect to the centrally positioned ultraviolet source. In this respect, it is noted that it is even more preferred if the zigzag-shaped components are connected to the inner wall of the housing, as in that case, it is sure that a situation in which bacteria might pass between the components and the wall as mentioned cannot occur.

The inflow conditions upstream of the zigzag-shaped components may be controlled by applying means for straightening a flow of fluid at at least one of the inlet side and the outlet side of the housing. In a preferred embodiment, these means comprise an element having inlet openings for letting in fluid at one side and outlet openings for letting out fluid at another side, wherein each inlet opening is in communication with a plurality of outlet openings. Practical examples of such an element include an embodiment of the element comprising a foam-like material, and an embodiment of the element according to which the element is shaped like a knitted mesh, for example, a stainless steel knitted mesh. In general, the element may have a clew-like appearance, and does not need to be expensive, as may be concluded on the basis of the examples as mentioned. Furthermore, the element may be arranged such as to surround an end of the central element, in other words, an end of the central element may be accommodated inside the flow straightening means. The flow straightening means may have a function in supporting the central element, so that costs may be reduced even further. Furthermore, the flow straightening means may also have a shielding function, i.e. may be arranged such that certain areas of the device are protected from the influence of the ultraviolet light.

The above-described and other aspects of the present invention will be apparent from and elucidated with reference to the following detailed description of a water disinfecting device according to the present invention.

BRIEF DESCRIPTION OF THE DRAWINGS

The present invention will now be explained in greater detail with reference to the figures, in which equal or similar parts are indicated by the same reference signs, and in which.

DETAILED DESCRIPTION OF EMBODIMENTS

Figure 1:
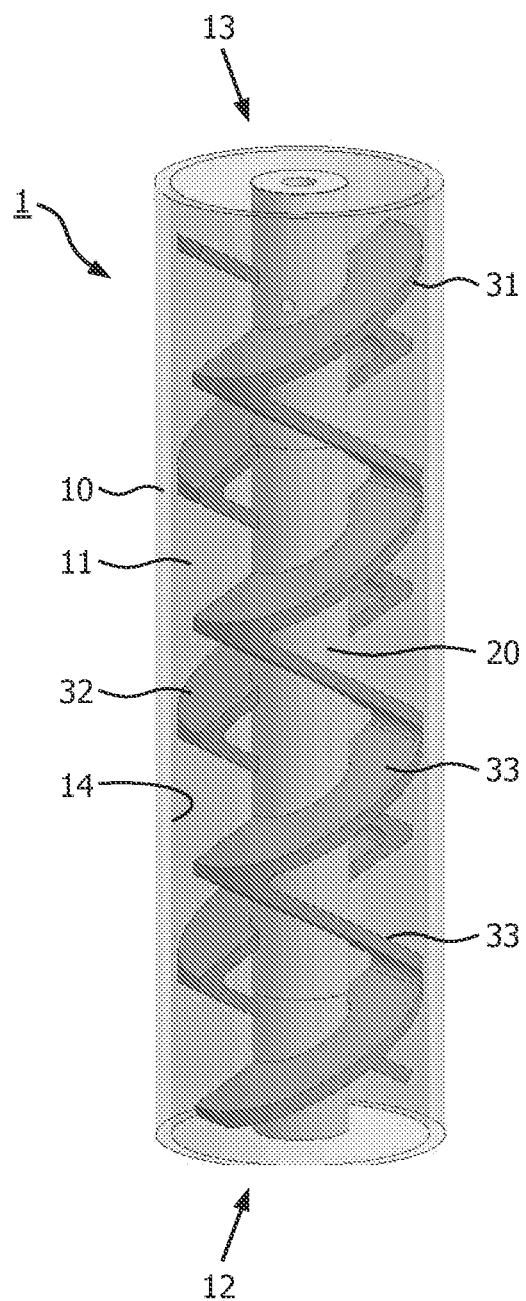
FIG. 1 diagrammatically shows a housing of the water disinfecting device according to the present invention, and zigzag-shaped components and an ultraviolet lamp of the device, which are arranged inside the housing.

FIG. 1 shows a housing 10 of a water disinfecting device 1 according to the present invention. In the shown example, the housing 10 is shaped like a cylinder having a circular circumference. The housing 10 has an interior space 11 which is suitable for containing water. In fact, during operation of the device 1, water is made to flow through the housing 10, wherein the water is supplied to the housing 10 through an inlet 12, and wherein the water exits the housing at an outlet 13, wherein each of the inlet 12 and the outlet 13 are arranged at another end of the housing 10.

Inside the housing 10, a source 20 for emitting ultraviolet light and two zigzag-shaped components 31, 32 are arranged. In this example, the source is a lamp 20, in particular a lamp 20 having an elongated, tube-shaped appearance. Furthermore, the lamp 20 has a central position in the housing 10, wherein longitudinal axes of the housing 10 and the lamp 20 practically coincide. The zigzag-shaped components 31, 32 serve for directing a flow of water from one side of the lamp 20 to another, and for ensuring that all water elements come in the vicinity of the lamp 20 at some point during their presence in the housing 10.

In the shown example, the zigzag-shaped components 31, 32 are identical, wherein each of the zigzag-shaped components 31, 32 comprises a number of steps 33 which are shaped like a portion of an ellipse having a central hole. The shape and size of the zigzag-shaped components 31, 32 is adapted such as to fit in the space which is present between an inner wall 14 of the housing 10 and the lamp 20, wherein the central hole of the ellipse shape of the steps 33 of the zigzag-shaped components 31, 32 is shaped such as to closely surround the lamp 20, and wherein an outer circumference of the ellipse shape of the steps 33 of the zigzag-shaped components 31, 32 is shaped such as to closely contact the inner wall 14 of the housing 10.

In the axial direction, i.e. the direction in which the longitudinal axes of the housing 10 and the lamp 20 are extending, the positions of the zigzag-shaped components 31, 32 are shifted with respect to each other. This means that the steps 33 of the zigzag-shaped components 31, 32 cross each other in a central region, i.e. at the lamp 20, wherein two steps 33 at the same portion of the length of the lamp 20 constitute legs of an X shape, as it were, wherein each leg is present at another side of the lamp 20. If the zigzag-shaped components 31, 32 would not be arranged in a shifted fashion in the axial direction, a space between the zigzag-shaped components 31, 32 and the inner wall 14 would be required in order to avoid blockage of a flow of water that needs to be present in the housing 10 during a water disinfecting process. However, such a space would be blocked from the ultraviolet radiation emitted by the lamp 20, which is highly undesirable. Furthermore, on the basis of the shifted positioning, a counter current flow is obtained, which enhances mixing.

Every zigzag-shaped component 31, 32 partly surrounds the lamp 20, but as a combination, the zigzag-shaped components 31, 32 provide complete coverage of the lamp 20 in the circumferential direction, as seen along a total of a length of the zigzag-shaped components 31, 32 in the axial direction of the lamp 20. Thus, when the whole of the lamp 20 and the zigzag-shaped components 31, 32 is looked at in the axial direction, a ring-shaped structure around the lamp 20 can be discerned, which is not interrupted at any place.

Figure 2:
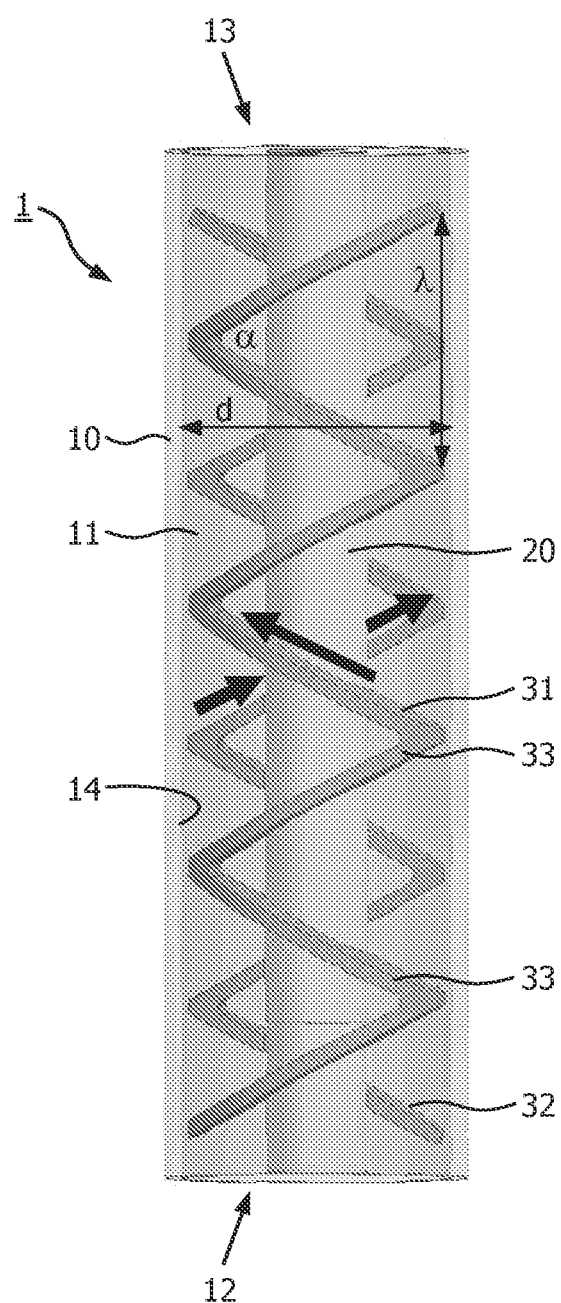
FIG. 2 diagrammatically shows another view of the housing, the zigzag-shaped components and the ultraviolet lamp.

FIG. 2 shows another view of the housing 10, and the lamp 20 and the zigzag-shaped components 31, 32 arranged inside the housing 10. By means of arrows, the direction in which water flows through the housing 10 during operation is indicated in FIG. 2. Furthermore, FIG. 2 illustrates how a diameter d of the zigzag-shaped components 31, 32, a height λ of two steps 33 of the zigzag-shaped components 31, 32, and an angle α between the steps 33 of the zigzag-shaped components 31, 32 are measured. In a practical embodiment of the device 1 according to the present invention, it is preferred if a ratio of the height λ of two steps 33 and the diameter d, λ/d, is in a range of 0.1 to 5, wherein it is even more preferred if this ratio is in a range of 0.5 to 3, and it is preferred if the angle α between the steps 33 is in a range of 5° to 80°, wherein it is even more preferred if this angle α is in a range of 20° to 60°.

Figure 3:
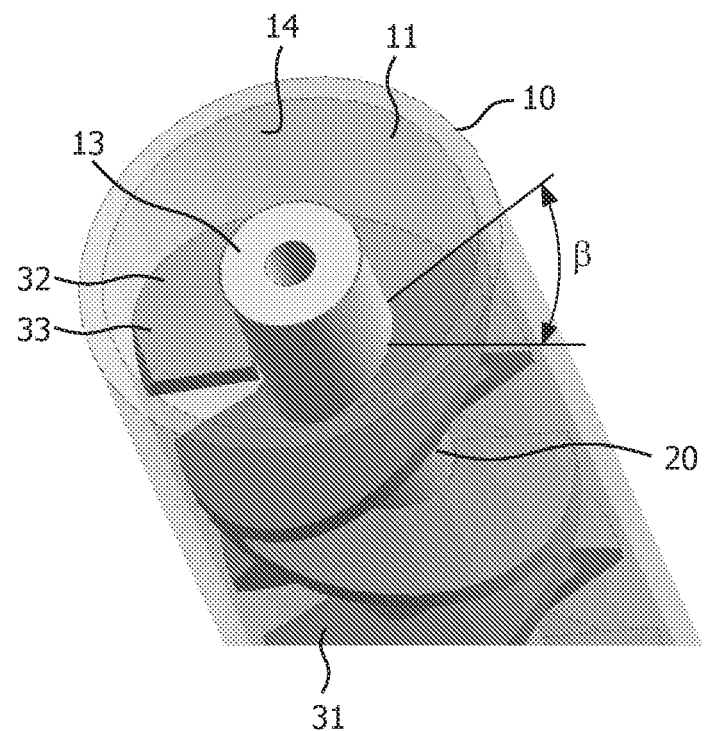
FIG. 3 shows a portion of the housing, the zigzag-shaped components and the ultraviolet lamp.

FIG. 3 illustrates a notable aspect of the present invention, namely the fact that there is a partial overlap of the zigzag-shaped components 31, 32 in the circumferential direction. In particular, edge regions of the steps 33 of the zigzag-shaped components 31, 32, as the one that is circled in FIG. 3, overlap. An overlap angle β, which is indicated in FIG. 3 as well, is preferably in a range of 5° to 45°, more preferably in a range of 5° to 15°.

Due to the specific design of the zigzag-shaped components 31, 32, a water disinfecting process can be most effective. When water is made to flow from the inlet 12 of the housing 10 to the outlet 13, it is not possible for short-cuts to appear. All water elements are moved to a position close to the lamp 20 at some point, so that the bacteria present in those elements can be eliminated. Due to the overlap which is present between steps 33 of the two zigzag-shaped components 31, 32, the water cannot find a way between the zigzag-shaped components 31, 32. Instead, the steps 33 of the zigzag-shaped components 31, 32 need to be followed by the water, wherein the water is forced to flow from one side of the lamp 20 to another at certain points. Another factor which plays a role in avoiding short-cuts is the fact that the zigzag-shaped components 31, 32 bridge the space between the lamp 20 and the inner wall 14 of the housing 10. Preferably, the zigzag-shaped components 31, 32 are connected to the inner wall 14 of the housing 10, so that it is sure that there is no gap which might be passed by bacteria at the position where the ultraviolet irradiance levels are the lowest.

The zigzag-shaped components 31, 32 can be made of a current conducting material such as a metal. In any case, it will be understood that it is advantageous if the zigzag-shaped components 31, 32 are made of material that is resistant to ultraviolet radiation. An advantage of metal or another light reflective material is that reflection of the ultraviolet light enhances the ultraviolet light received by the bacteria. Using metal also allows the zigzag-shaped components 31, 32 to be part of an electrical circuit for powering the lamp 20. An example of a situation in which this would be advantageous is when an excimer lamp as described in EP 697374 is used. On the other hand, it is also possible for the zigzag-shaped components 31, 32 to be made of a transparent material such as glass. In that way, too much absorption of ultraviolet light by the zigzag-shaped components 31, 32 is avoided, and the ultraviolet output of the lamp 20 is used more efficiently.

The surface of the zigzag-shaped components 31, 32 may be either smooth or textured. When a texture is applied, the flow behaviour of the water may be enhanced by recirculation zones, which are obtained on the basis of the surface roughness of the zigzag-shaped components 31, 32. The thickness of the steps 33 of the zigzag-shaped components 31, 32 is preferably in a range of 0.1 mm to 5 mm, more preferably in a range of 0.1 mm to 2 mm.

Figure 4:
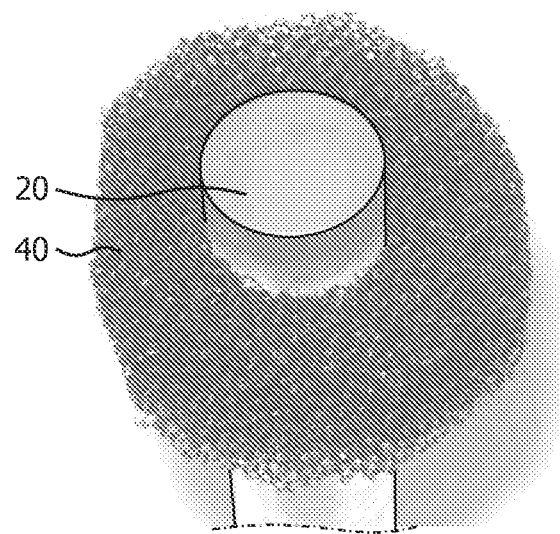
FIG. 4 diagrammatically illustrates an application of a flow straightening element in the device by diagrammatically showing such an element and a portion of the ultraviolet lamp.

FIG. 4 illustrates the possibility of applying means for straightening an inflow and/or an outflow of water. In particular, a foam-like element 40 is shown, which may very well serve for realizing a desired control of the inflow conditions. As most inlet situations involve a sudden change in area, the flow upstream of the zigzag-shaped components 31, 32 is not well-known, and there is a risk that areas with different flow velocities or with flow circulations (or turbulent structures) are created, which may negatively influence the effectiveness of the zigzag-shaped components 31, 32 in directing the flow. The same is true in respect of the outlet conditions. Therefore, it is also advantageous to have a flow straightening element 40 at the outlet side of the housing 10.

The flow straightening element 40 may have any suitable shape, and may comprise any suitable material. FIG. 4 illustrates the fact that the flow straightening element 40 may be shaped and positioned such as to surround an end of the lamp 20. The flow straightening element 40 may have an additional function in supporting the lamp 20 inside the housing 10, wherein there is no need to use additional supporting elements, or wherein at least less additional support elements are required. Another additional function of the flow straightening element 40 may be blocking ultraviolet light and thereby protecting components of the water disinfecting device 1 from the harmful influence of the ultraviolet light.

It will be clear to a person skilled in the art that the scope of the present invention is not limited to the examples discussed in the foregoing, but that several amendments and modifications thereof are possible without deviating from the scope of the present invention as defined in the attached claims. While the present invention has been illustrated and described in detail in the figures and the description, such illustration and description are to be considered illustrative or exemplary only, and not restrictive. The present invention is not limited to the disclosed embodiments.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the present invention.

In general, the present invention is applicable in devices in which a fluid needs to be exposed to a certain element during a period of time, and needs to be directed towards that element, such that all fluid elements are put in the vicinity of the element at a certain point. The element may be a source 20 for emitting radiation, as is the case in the shown example, but this is not necessary within the scope of the present invention. For sake of completeness, it is noted that the fact that water is mentioned as an example of a fluid should not be understood such as to mean that the present invention is limited to that type of fluid. Furthermore, it is noted that in the context of this description, the terms "ultraviolet light" and "ultraviolet radiation" are used to indicate one and the same phenomenon, namely waves having a wave length in the ultraviolet region.

For sake of completeness, it is noted that the fact that in the shown example, the zigzag-shaped components 31, 32 are identical should not be understood such as to mean that this is essential. What matters is that the zigzag-shaped components 31, 32 are capable of realizing sufficient mixing and avoiding short-cuts, so that an ultraviolet treatment of fluid can be effective.

It is advantageous to have a flow straightening element 40 such as shown in FIG. 4 in the device 1 according to the present invention, but it should be understood that this element 40 does not constitute an essential element of the device 1.

The present invention can be summarized as follows. A device 1 comprises a housing 10 having an interior space 11 for containing fluid, an inlet 12 for letting in fluid to the housing 10, an outlet 13 for letting out fluid from the housing 10, an element 20 which is arranged inside the housing 10, and means 31, 32 which are arranged inside the housing 10 as well, and which serve for guiding the fluid from the inlet side of the housing 10 to the outlet side of the housing 10, around the element 20. The fluid guiding means comprise two zigzag-shaped components 31, 32 extending along at least a portion of the element 20 and, as a combination, providing complete coverage of the element 20 in a circumferential direction, i.e. a direction around the element 20, as seen along a total of a length of the zigzag-shaped components 31, 32 in an axial direction of the element 20, wherein the zigzag-shaped components 31, 32 partly overlap in the circumferential direction.

The zigzag-shaped components 31, 32 are sized and shaped such that short-cuts between the inlet side and the outlet side of the housing 10 do not exist. When the element is a source 20 for emitting ultraviolet light, for example, it is ensured that all fluid elements of fluid flowing through the housing 10 are exposed to the light to such an extent that the bacteria which are present in the fluid are eliminated, as the fluid elements cannot follow a more or less straight and quick path from the inlet side to the outside, and are forced to repeatedly move from one side of the source 20 to another side, so that it is not possible to constantly be in an area at an inner wall 14 of the housing 10, which is an area where irradiance levels are the lowest. Generally speaking, the shape of the zigzag-shaped components 31, 32 is chosen such that the effectiveness of a treatment of fluid with ultraviolet light, or similar processes, is optimal.

The invention claimed is:

1. A device comprising; a housing having an interior space for including fluid, an inlet for letting in fluid to the housing, and an outlet for letting the fluid out from the housing; an element having a cylindrical shape and a length arranged inside the housing length wise between the outlet and inlet; and two components arranged inside the housing for guiding fluid from the inlet to the outlet of the housing and bridging the element and the inner wall of the housing, each component having a cross section of an open circle for covering only a portion of a circumference of the element, the two components are shifted along the length of the element for together covering the full circumference of the element, wherein portions of the two components partly overlap in a circumferential direction around the element.

2. The device according to claim 1, wherein each of the components spans an angle of more than 180° around the cross section of the element.

3. The device according to claim 1, wherein the overlap comprises an angle in a range of 5° to 45°.

4. The device according to claim 1, wherein the overlap comprises an angle in a range of 5° to 15°.

5. The device according to claim 1, wherein the element is a source for emitting ultraviolet light.

6. The device according to claim 1, wherein the housing comprises a cylinder shape having a circumference, and each of the components comprise a plurality of steps shaped like a portion of an ellipse having a central hole.

7. The device according to claim 1, wherein the components contact the element and the inner wall of the housing.

8. The device according to claim 1, wherein the components are connected to the inner wall of the housing.

9. The device according to claim 6, wherein a ratio of a height of two of the steps of the components and a diameter of the components is in a range of 0.1 to 5.

10. The device according to claim 6, wherein an angle between the steps of the components is in a range of 5° to 80°.

11. The device according to claim 1, further comprising one or more flow straightening elements for straightening a flow of fluid at at least one of the inlet side and the outlet side of the housing.

12. The device according to claim 11, wherein the one or more flow straightening elements comprise openings for letting the fluid in and letting the fluid out, each opening is in communication with a corresponding inlet and outlet.

13. The device according to claim 11, wherein the one or more flow straightening elements comprise a foam-like material.

14. The device according to claim 11, wherein the one or more flow straightening elements are shaped as a knitted mesh.

15. The device according to claim 11, wherein an end of the element is accommodated inside the one or more flow straightening elements.

16. The device according to claim 1, wherein the components comprise a zigzag-shape.

* * * * *